(12) United States Patent
Fellenstein et al.

(10) Patent No.: US 7,685,620 B2
(45) Date of Patent: *Mar. 23, 2010

(54) APPARATUS AND METHOD OF SEARCHING FOR DESIRED TELEVISION CONTENT

(75) Inventors: Craig William Fellenstein, Brookfield, CT (US); Doreen Galli, Smyrna, GA (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/260,939

(22) Filed: Oct. 29, 2008

(65) Prior Publication Data

US 2009/0049481 A1 Feb. 19, 2009

Related U.S. Application Data

(63) Continuation of application No. 10/105,124, filed on Mar. 21, 2002, now Pat. No. 7,467,398.

(51) Int. Cl.
*G06F 3/00* (2006.01)
*G06F 13/00* (2006.01)
*H04N 5/445* (2006.01)

(52) U.S. Cl. .................... 725/53; 725/137; 725/142
(58) Field of Classification Search .................. 725/46, 725/47, 52, 53, 55, 134, 137, 142; 707/3, 707/4, 6, 7, 10, 104.1; 704/200, 275; 348/461, 348/468

See application file for complete search history.

(56) References Cited

U.S. PATENT DOCUMENTS

| | | | |
|---|---|---|---|
| 5,481,296 A | 1/1996 | Cragun et al. | |
| 5,703,655 A | 12/1997 | Corey et al. | |
| 5,859,662 A | 1/1999 | Cragun et al. | |
| 6,005,561 A | 12/1999 | Hawkins et al. | |
| 6,141,678 A | 10/2000 | Britt, Jr. | |

(Continued)

*Primary Examiner*—Ngoc K Vu
(74) *Attorney, Agent, or Firm*—Yee & Associates, P.C.; William H. Steinberg; Rudolf O. Siegesmund

(57) ABSTRACT

The present invention is an apparatus and method for allowing a user to search for specific content across many television channels in order to locate desirable television shows related to the searched content. Multiplexed cable signals flow thorough a logical unit which buffers text associated with the voice stream of each station via the pre-encoded closed-captioning signal or through the real-time voice translation within the logical unit. The user then enters search terms through one of a variety of different input devices. Upon entry of the search terms, the logical unit will compare the entered term with those available keywords stored in each buffer. Lexical parsing associates terms which may differ from plural to singular forms, or in tense. Additionally, synonym comparisons may be made. The logical unit will return a list of matches for the search criteria and allows the user the option of going directly to the television program. The logical unit also evaluates each returned item for its relevancy to the keywords. When not in use, the logical unit maintains a quiescent but monitoring state permitting continuous creation of lexical buffers. This permits the user who turns the television on to immediately have such search terms available. Alternatively, the logic is implemented at the cable provider and enabled through interactive links to the home. In that case, the home logical unit is unnecessary.

20 Claims, 2 Drawing Sheets

U.S. PATENT DOCUMENTS

| | | |
|---|---|---|
| 6,266,094 B1 | 7/2001 | Taylor, Jr. |
| 6,298,482 B1 | 10/2001 | Seidman et al. |
| 2002/0042923 A1 | 4/2002 | Asmussen et al. |
| 2002/0174430 A1 | 11/2002 | Ellis et al. |

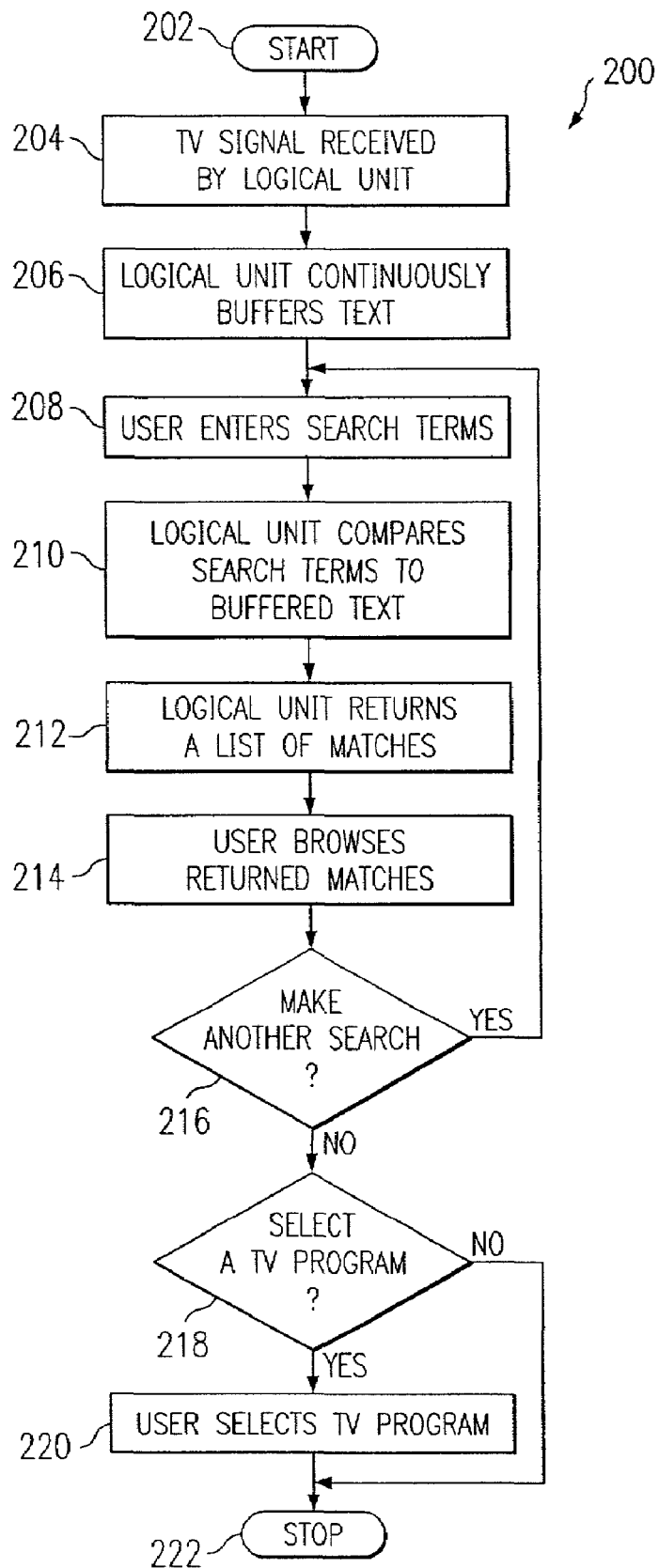

APPARATUS AND METHOD OF SEARCHING FOR DESIRED TELEVISION CONTENT

This application is a continuation of application Ser. No. 10/105,124 filed Mar. 21, 2002 now U.S. Pat. No. 7,467,398, status, allowed.

FIELD OF THE INVENTION

The invention relates to an apparatus and method of searching television programming for specific content.

BACKGROUND OF THE INVENTION

Television is one of the most popular communication mediums today. In fact, television has become so popular that more information is being broadcast every day than is possible for any one person to assimilate. Therefore, television viewers frequently desire to search out television programs that are related to a specific topic of interest. For example, a viewer may want to locate television programs related to a particular animal such as a bear, a particular country such as India, or a particular government agency such as the police. However, locating specific television programs which pertain to a desired topic is difficult and time consuming. It is virtually impossible to quickly locate a specific topic across hundreds of television stations broadcasting thousands of different types of shows by scanning through the various television channels. Therefore, a need exists for an apparatus and method to searching through the multitude of television channels and the multitude of programming on those channels by which a viewer could enter specific keyword terms into a search engine and then view a list of programming related to the entered terms that would be provided by search engine.

Similarly, the Internet is a very popular medium for communication of information. As it is impossible for anybody to obtain all of the information on the Internet, search engines have proved invaluable in allowing users to access specific information on the Internet. Since many television viewers are familiar with the Internet and Internet search engines, there exists a need for an apparatus and method for searching through television programming similar to the method that search engines use for searching through the Internet.

Such technology is known in the art. U.S. Pat. No. 5,481, 296 issued on Jan. 2, 1996 discloses an "Apparatus and Method for Selectively Viewing Video Information." However, the '296 patent does not disclose an improved method for searching for keywords within the closed captioning text. Additionally, the '296 patent does not disclose a method for searching for synonyms of the desired keywords. Furthermore, while the '296 patent discloses a method for searching for keywords in video signals, the '296 patent does not disclose a method of evaluating the effectiveness of the returned search items.

Therefore, a need exists for an apparatus and method for searching television programming which will enable the user to enter keywords and view a list of programming which is related to the keywords. A need also exists for an apparatus and method which is capable of searching for synonyms of the keywords. Finally, a need exists for an apparatus and method which will evaluate the returned search items and inform the user as to the relevancy of each returned item.

SUMMARY OF THE INVENTION

The present invention, which meets the needs stated above, is an apparatus and method for allowing a user to search for specific content across many television channels in order to locate desirable television shows related to the searched content. This television viewing mechanism is based upon real-time network television broadcasting of shows in progress which provide audio captioning, as opposed to cable provider television folders, movie indexed shows, guides, or live audio feeds. By creating buffers containing lexical search terms, dynamic search capabilities can be provided which represent an improvement over existing technology. In the preferred embodiment, the fundamental logical manipulations occur at the user's location either in the tuning unit within the television or in a set-top box (the logical unit). These multiplexed cable signals flow thorough the logical unit which buffers text associated with the voice stream of each station. This can be done via the pre-encoded closed-captioning signal or through the real-time voice translation (e.g. through ViaVoice or other well-known technologies) within the logical unit. The user then enters search terms through one of a variety of different input devices. In cases where viewers are unable to determine exact spelling or phraseology content, keyword masking or wildcards can be included in the search criteria. For example, if the user is interested in finding television shows about the mating habits of bears, the user could enter into the search screen "bear* mat*" and be able to find the singular forms of a "bear" and the "mate" or "mating" habits of the species. This is accomplished by utilizing lexical parsing engines that scan television captioning text on all cable channels in order to locate the searched keywords and inform the user that the television channels are currently discussing content relative to the specific search.

Upon entry of the search terms, the logical unit will compare the entered term with those available keywords stored in each buffer. Lexical parsing associates terms which may differ from plural to singular forms, or in tense. Additionally, synonym comparisons may be made. The logical unit will return a list of matches for the search criteria and allow the user the option of going directly to the television program. The logical unit also evaluates each returned item for its relevancy to the keywords. When not in use, the logical unit maintains a quiescent but monitoring state permitting continuous creation of lexical buffers. The continuous creation of lexical buffers permits the user who turns the television on to immediately have such search terms available. Alternatively, the logic is implemented at the cable provider and enabled through interactive links to the home. In that case, the home logical unit is unnecessary.

The present invention makes it easier to search cable television for the desired content. Instead of relying on static identifiers, the innovation allows dynamic and therefore more thorough and exhaustive searches to take place.

BRIEF DESCRIPTION OF THE DRAWINGS

FIG. 2 is a flowchart of the logic of the present invention.

DETAILED DESCRIPTION OF THE PREFERRED EMBODIMENT

The term "multiplex" as used herein means the process of funneling several different streams of data over a common communications line. The term "cable provider" as used herein means a company which provides television service to multiple users and includes satellite television services. The term "lexical parsing" as used herein means a process of finding matches to a desired search term by comparing the desired search term letter-by-letter with the terms in an available database.

Figure 1:
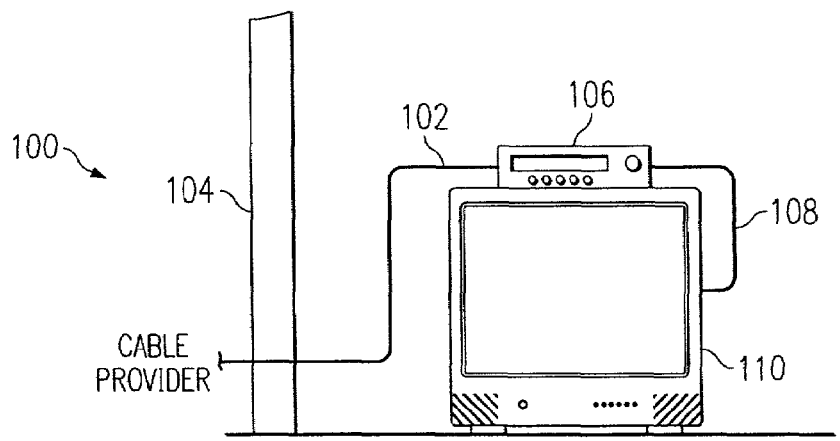
FIG. 1 is an illustration of the invention interacting with a cable provider and a television set.

FIG. 1 is an illustration of the invention 100 interacting with a cable provider and a television set. The cable provider (not shown) provides a television signal through a coaxial cable 102 that runs through the user's wall 104 and into the logical unit 106. Logical unit 106 buffers the cable signal as described below and displays the information on television 110 via television connection 108. Alternatively, logical unit 106 may be placed at the same location as the cable provider such that it is unnecessary to have logical unit 106 at the user's location.

FIG. 2 is a flowchart of the logic contained within logical unit 106 of the present invention. Search program 200 starts (202) and logical unit 106 receives the cable signal transmitted by the cable provider (204). The cable signal is multiplexed and comprises at least a visual signal, an audio signal, and a closed caption text signal. Moreover, the multiplexed cable signal is not limited to real-time cable programming. The multiplexed signal may also contain information regarding past and future television programs. As logical unit 106 receives the signal, search program 200 continuously buffers the transmitted multiplexed cable signal (206). In buffering the signal, search program 200 obtains the closed-caption text from the cable signal and store the words contained in the captioning text along with the television channel number and time of the television program. Alternatively, search program 200 can buffer the television signal by analyzing the audio signal and buffering the keywords from the audio signal. The text buffering described above is known in the art. Furthermore, the buffering process is not limited to one television channel or one specific time period. If a user desires to buffer different channels at different times, then the user may do so by means of search program 200. For example, if search program 200 has ten hours of buffering time available, the user can have search program 200 buffer ten hours of a channel such as Cable Network News (CNN). Alternatively, search program 200 can buffer four hours of CBS, four hours of CNN, and two hours of the weather channel. Furthermore, the buffering times do not have to be similar. The user can define the CBS buffering time from 5 am to 9 am, the CNN buffering time from 8 am to noon, and the weather channel from 1 pm to 3 pm. Additionally, search program 200 is not limited to the English language. Search program 200 is capable of buffering television in multiple languages simultaneously. Thus, at any given time search program 200 is capable of buffering an enormous variety of television programs.

The user then enters keyword terms that represent the search criteria for search program 200 (208). The search terms can be entered via a keyboard, stylus, infrared port, or on-screen programming. In entering the search terms, search program 200 will recognize conventional Boolean search terms such as "AND", "OR", and "NOT". Search program 200 is capable of accepting wildcard search terms. For example, the wildcard search term "run*" would search for run and all possible variations such as runner, running, runners, and so on. Search program 200 also compares each of the search terms to a dictionary database. If any of the search terms are not in the dictionary database, search program 200 will determine related words using lexical parsing and query the user if the terms are relevant to the desired search. Lexical parsing solves the problem of tense variation in the search terms. Search program 200 is also capable of resolving ambiguities in entered search terms by comparing the search terms to the dictionary database. Those skilled in the art are aware of how to configure a search program to resolve ambiguities. In alternative embodiments, the query step can be removed where search program 200 automatically adds the lexically parsed words to the list of search terms. Additionally, the search criteria can comprise a date restriction (i.e. only today's programs, only programs on this week, or only programs on Tuesdays). Furthermore, the search criteria can comprise restrictions based on specific channels (i.e. only programs on ESPN, DISCOVERY, CNN, or VH1, or alternatively, only programs on channels 8, 12, 25, 45, or 54).

Search program 200 then compares the search terms to the buffered text (210). Search program 200 will compare the search terms to the terms contained within the buffer. In comparing the search terms with the buffered programs, search program 200 will also cerate a list of synonym search terms. By accessing a thesaurus database, search program 200 can obtain relevant synonyms and use those terms to search the buffered text as well. When the search term matches a word in the buffered text, search program 200 will mark the program and continue to search through the rest of the buffered text. When the entire buffered text has been searched, search program 200 evaluates the relevancy of each flagged item. In evaluating the relevancy of each flagged item, search program 200 looks to the original search terms, the synonyms search terms, the lexically parsed search terms, and the date, time and channel specified by the user. Search program 200 then ranks the flagged items from most relevant to least relevant.

Search program 200 then displays the list of television programs which were previously marked in step 210 (212). Search program 200 will organize the results of the search according to how well they correspond to the entered search criteria. The results of the search are displayed with the time and television channel pertaining to the television program. The user then browses the television programs returned in step 212 (214) and makes a determination whether they would like to conduct another search (216). If the user does want to conduct another search, search program 200 returns to step 208. If the user does not want to conduct another search, the user makes a determination whether they would like to select a television program (218). If the user decides to select a television program, the user selects a television program, search program 200 displays the selected television program (220), and search program 200 ends (222). If the user does not want to select a television program, then search program 200 ends (222).

Figure 3:
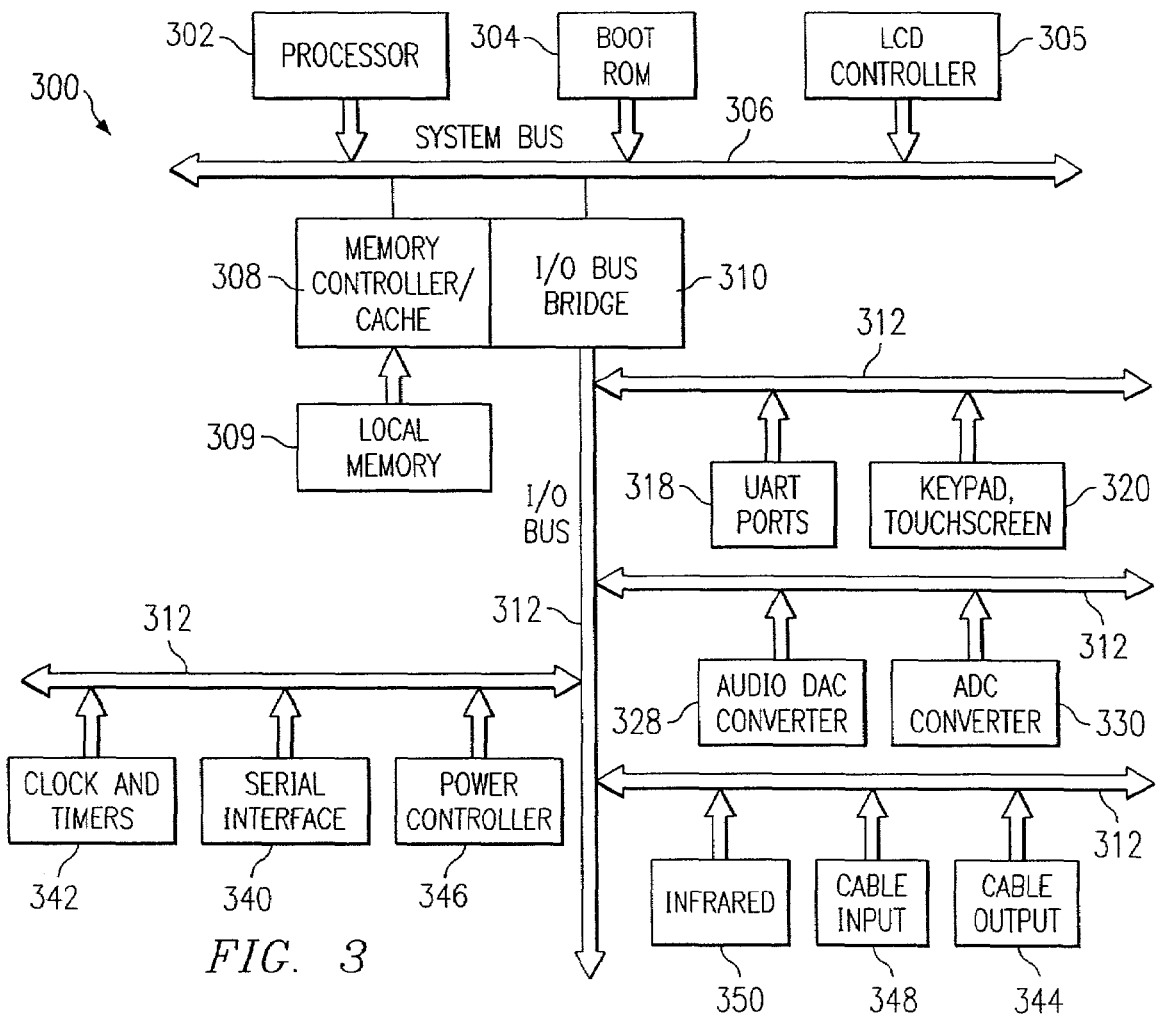
FIG. 3 is a depiction of the data processing system contained within the logical unit.

FIG. 3 is a depiction of the data processing system 300 contained within logical unit 106 (See FIG. 1). Data processing system 300 comprises processor 302, boot ram 304, and LCD controller 305 coupled to system bus 306. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted. Peripheral components are connected via I/O bus 312. Typical peripheral components include Universal Asynchronous Receiver Transmitter (UART) 318, a keypad or touch screen 320, digital-to-analog converters 328, analog-to-digital converters 330, serial interface controller 340, clocks and timers 342, cable output to the television 344, power controller 346, cable input from the cable provider 348, and infrared ports 350. Those skilled in the art will appreciate the depiction of data processing system 300 in FIG. 3 is exemplary and is not intended as an architectural limitation of the present invention. Data processing system 300 may be a separate single controller.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A programmable apparatus for identifying a real-time television signal of interest to a user, comprising:
   a logical unit having a memory and connected to a television;
   a program in the memory;
   the logical unit being directed by the program to perform a plurality of steps comprising:
   responsive to a user entering a search parameter into the logical unit, simultaneously buffering a plurality of audio voice streams of a plurality of real-time television signals in a plurality of languages;
   translating the plurality of audio voice streams into text associated with each of the plurality of real-time television signals in the plurality of languages;
   buffering the text into a lexical buffer;
   searching the lexical buffer for the search parameter;
   displaying a list of the plurality of real-time television signals in the plurality of languages in order of relevance to the search parameter; and
   the user selecting a first real-time television signal from the list, whereby the first real-time television signal is displayed on a television in real-time;
   wherein the user specifies the plurality of real-time television signals, an amount of buffering time to be allocated for each of the plurality of real-time television signals, and a plurality of time periods for each of the plurality of real-time television signals to be buffered.

2. The programmable apparatus of claim 1 wherein the search parameter is a keyword.

3. The programmable apparatus of claim 1 further comprising searching a closed captioning signal.

4. The programmable apparatus of claim 1 wherein the buffering occurs when a television unit is not activated.

5. The programmable apparatus of claim 1 further comprising decoding the plurality of real-time television signals.

6. The programmable apparatus of claim 1 further comprising linking the search parameter to a second search parameter by at least one logical relationship.

7. The programmable apparatus of claim 1 further comprising comparing the search parameter to a dictionary.

8. The programmable apparatus of claim 7 further comprising obtaining a lexically parsed equivalent and searching the plurality of real-time television signals for a data that matches the lexically parsed equivalent.

9. The programmable apparatus of claim 1 further comprising comparing the search parameter to a thesaurus.

10. The programmable apparatus of claim 9 further comprising obtaining a synonym equivalent and searching the plurality of real-time television signals for a data that matches the synonym equivalent.

11. A computer readable memory for causing a computer to identify a real-time television signal of interest to a user, comprising:
    a computer readable memory;
    a computer program stored in the computer readable memory;
    the computer readable memory so configured by the computer program, causes a logical unit to perform a plurality of steps comprising:
    receiving a search parameter entered by a user into the logical unit;
    simultaneously buffering a plurality of audio voice streams of a plurality of real-time television signals in a plurality of languages;
    translating the plurality of audio voice streams into text associated with each of the plurality of real-time television signals in the plurality of languages;
    buffering the text into a lexical buffer;
    searching the lexical buffer for the search parameter;
    displaying a list of the plurality of real-time television signals in the plurality of languages in order of relevance to the search parameter; and
    the user selecting a first real-time television signal from the list, whereby the first real-time television signal is displayed on a television in real-time;
    wherein the user specifies the plurality of real-time television signals, an amount of buffering time to be allocated for each of the plurality of real-time television signals, and a plurality of time periods for each of the plurality of real-time television signals to be buffered.

12. The computer readable memory of claim 11 wherein the search parameter is a keyword.

13. The computer readable memory of claim 11 further comprising searching a closed captioning signal.

14. The computer readable memory of claim 11 wherein the buffering occurs when a television unit is not activated.

15. The computer readable memory of claim 11 further comprising decoding the plurality of real-time television signals.

16. The computer readable memory of claim 11 further comprising linking the search parameter to a second search parameter by at least one logical relationship.

17. The computer readable memory of claim 11 further comprising comparing the search parameter to a dictionary.

18. The computer readable memory of claim 17 further comprising obtaining a lexically parsed equivalent and searching the plurality of real-time television signals for a data that matches the lexically parsed equivalent.

19. The computer readable memory of claim 11 further comprising comparing the search parameter to a thesaurus.

20. The computer readable memory of claim 19 further comprising obtaining a synonym equivalent and searching the plurality of real-time television signals for a data that matches the synonym equivalent.

* * * * *